(12) United States Patent
Spirin et al.

(10) Patent No.: US 6,943,526 B2
(45) Date of Patent: Sep. 13, 2005

(54) RECHARGEABLE BATTERY

(75) Inventors: Yury Leonidovich Spirin, Moscow (RU); Vladimir Stepanovich Dubinin, Moscow (RU)

(73) Assignee: IntelliKraft Limited, Oxford (GB)

( * ) Notice: Subject to any disclaimer, the term of this patent is extended or adjusted under 35 U.S.C. 154(b) by 0 days.

(21) Appl. No.: 10/424,663

(22) Filed: Apr. 26, 2003

(65) Prior Publication Data

US 2004/0219426 A1 Nov. 4, 2004

(Under 37 CFR 1.47)

Related U.S. Application Data

(63) Continuation of application No. PCT/GB01/04765, filed on Oct. 29, 2001.

(30) Foreign Application Priority Data

Oct. 28, 2000 (GB) .............................................. 0026392
Oct. 28, 2000 (GB) .............................................. 0026393

(51) Int. Cl.[7] .............................. H02J 7/00; H01G 7/00
(52) U.S. Cl. ...................................... 320/105; 29/25.42
(58) Field of Search ........................ 320/105; 29/25.42; 327/100; 252/62.2; 429/66, 90–93, 162

(56) References Cited

U.S. PATENT DOCUMENTS

| 4,179,627 A | * 12/1979 | Reitz ........................... 327/100 |
| 4,849,806 A | 7/1989 | Kahlen et al. ............... 257/762 |
| 6,372,377 B1 | * 4/2002 | Ovshinsky et al. ........... 429/66 |
| 6,432,577 B1 | * 8/2002 | Shul et al. .................... 429/162 |
| 6,627,099 B2 | * 9/2003 | Ono et al. .................. 252/62.2 |
| 6,733,928 B2 | * 5/2004 | Takeuchi .................... 429/337 |

FOREIGN PATENT DOCUMENTS

| DE | 4031623 | * 3/1992 |
| EP | 1156011 A1 | 11/2001 |
| GB | 2271666 | 4/1994 |
| RU | 1172906 | * 8/1985 |
| RU | 1807915 | * 4/1993 |
| RU | 2072280 | * 1/1997 |
| WO | WO 00/40506 | 7/2000 |

OTHER PUBLICATIONS

PCT/GB01/04765, search report, Mar. 14, 2002.*

* cited by examiner

Primary Examiner—Pia Tibbits
(74) Attorney, Agent, or Firm—Wyatt, Tarrant & Combs, L.L.P.

(57) ABSTRACT

There is disclosed a rechargeable battery comprising a solid state material (1) having formed therein a plurality of elongate holes with elongate conductors (2) located within the holes, a first pair of electrodes (3) formed or located on generally oppposed sides of the solid state material (1) in a first spatial orientation and a second pair of electrodes (4) formed or located on generally opposed sides of the solid state material (1) in a second spatial orientation different from the first, such that when a DC voltage is applied across the first pair of electrodes (3), an electric field is formed and induces electrostatic charges in the elongate conductors (2), thereby generating a voltage across the second pair of electrodes (4).

20 Claims, 1 Drawing Sheet

RECHARGEABLE BATTERY

CROSS-REFERENCE TO RELATED APPLICATIONS

This application is a continuation of copending PCT Application Number PCT/GB01/04765 filed Oct. 29, 2001, which is a continuation of copending United Kingdom applications Number GB 0026393.9 and GB 0026392.1) both filed Oct. 28, 2000, the full disclosures of which are hereby incorporated into the present application by reference.

BACKGROUND OF THE INVENTION

The present invention relates to a rechargeable battery, and in particular to a rechargeable battery incorporating a solid state material having longitudinally-extending holes into which longitudinally extending conductors are formed or placed.

Various rechargeable batteries are known in the art. These include chemical accumulators based, for example, on nickel-cadmium or nickel-metal hydride systems. These batteries have a limited operational life due to irreversible chemical changes that gradually take place within the battery upon charging and discharging, and they are environmentally unfriendly in that they contain toxic chemicals.

An accumulator comprising a capacitor having a pair of electrode plates, one on either side of a solid electrolyte is known from RU 2070756. The battery is charged by way of current flow through the electrolyte.

An accumulator comprising a capacitor having a pair of electrode plates immersed in a liquid electrolyte is known from RU 2132585. The battery is charged by way of current flow through the electrolyte.

A rechargeable battery comprising a piezoceramic component having a pair of attached electrodes is known from RU 2087066. The battery is charged by heating the piezoceramic component.

There is also known, from RU 2074475, an accumulator comprising a capacitor bank which is charged by way of a dynamo.

All of these devices have an inadequate operational life and tend to be environmentally unfriendly.

According to a first aspect of the present invention, there is provided a rechargeable battery including an energy storage member in the form of a solid state dielectric or semiconductor material having formed therein a plurality of holes with elongate conductors located within the holes and contacting the energy storage member at least at one point along their lengths, a first pair of electrodes adapted to apply a DC voltage therebetween and formed or located on generally opposed sides of the energy storage member in a first spatial orientation and a second pair of electrodes formed or located on generally opposed sides of the energy storage member in a second spatial orientation different from the first.

In operation, the application of a DC voltage across the first pair of electrodes forms an electric field across the solid state material which induces electrostatic charges in the elongate conductors, thereby generating a voltage across the second pair of electrodes.

Advantageously, at least some of the elongate conductors have substantially the same or similar spatial orientation to each other. In a particularly preferred embodiment, enough of the conductors extend in substantially the same or similar direction so as to give the solid state material anisotropic properties; that is to say, more conductors extend substantially in one given, predominant direction than in any other. The conductors and electrodes are preferably configured such that an imaginary line drawn between the first pair of electrodes extends substantially perpendicular to the predominant conductor direction and such that an imaginary line drawn between the second pair of electrodes extends substantially parallel to the predominant conductor direction.

According to a second aspect of the present invention, there is provided a rechargeable battery comprising an energy storage positioned between two pairs of electrodes. The energy storage member is made from solid-state dielectric or semiconductor material containing holes with elongate conductors located within the holes. The elongate conductors are formed so that they are attached to the solid state body at least at one point along their length. At least some of these conductors have substantially the same or similar spatial orientation to each other. A first pair of electrodes is located on generally opposed sides of energy storage member in a first spatial orientation and is adapted to apply DC voltage there between. A second pair of electrodes, being the output electrodes, is formed or located on generally opposed sides of the energy storage member in a second spatial orientation different from the first one.

The conductors and electrodes are preferably configured such that an imaginary line drawn between the first pair of electrodes extends substantially perpendicular to the predominant conductor direction and such that an imaginary line drawn between the second pair of electrodes extends substantially parallel to the predominant conductor direction.

The elongate conductors are formed so that they contact the solid state material at least at some point along their lengths.

Preferably, the first pair of electrodes is formed or located tightly against the solid state material.

Preferably, the second pair of electrodes is formed or located tightly against the solid state material.

The electrodes may be electroformed, electrodeposited or sputtered onto the solid state material. Alternatively, the electrodes may be formed separately and clamped, adhered or otherwise located on the solid state material.

The electrodes may be formed from metals such as gold, silver, platinum or copper or combinations thereof. Other metals may be used where appropriate.

The solid state material is a dielectric or semiconductor material, for example as described in the present applicant's copending International patent application WO 00/40506, the full disclosure of which is hereby incorporated into the present application by reference.

The solid state material may be a dielectric ceramic material such as a solid state crystalline ceramic material, including piezoceramic materials and solid composite mixtures of different ceramic materials. The solid state material may also be a semiconductor, such as silicon or gallium arsenide, among others. The solid state material may be a composite mixture of dielectric and semiconductor materials.

The solid state material may be manufactured in accordance with the manufacturing processes described in WO 00/40506; that is to say, the holes may be formed by an electrical erosion process and the conductors may be formed by local ion precipitation within the holes.

The holes may be in the form of pores, and preferably have a diameter of up to 200 nm, more preferably from 10 nm to 200 nm.

The conductors may be formed from metals such as gold, silver, platinum or copper or combinations thereof. Other metals may be used where appropriate. The conductors are preferably in the form of elongate filaments or fibres, and one or more filaments or fibres may be located within a given elongate hole.

The conductors preferably have a diameter of up to 200 nm, more preferably from 10 nm to 200 nm.

The holes and the conductors advantageously have a longitudinal length of 100 nm to 1000 nm, although lengths outside this range may be appropriate in particular circumstances.

When a DC voltage is applied across first pair of electrodes, a DC electric field is generated across the solid state material. This electric field causes electrostatic charges to be induced in the elongate conductors, and these charges will then move under the influence of the electric field so as to induce a potential difference across the second pair of electrodes. By applying a potential difference across the first pair of electrodes and connecting a load or other circuitry across the second pair, current can be caused to flow through the load or other circuitry.

The rechargeable cell of the present invention does not include any chemically active components, and is thus environmentally friendly. Furthermore, because there is little or no mechanical or thermal degradation during recharging, the cell of the present invention has an improved operational life as compared to existing accumulators. In some embodiments, the present invention provides a 20% improvement in operational life over existing rechargeable batteries.

For a better understanding of the present invention and to show how it may be carried into effect, reference shall now be made by way of example to the accompanying drawing.

DESCRIPTION OF DRAWINGS

FIG. 1 shows a rechargable battery 10 comprising a solid state ceramic block 1 having a plurality of elongate pores 5 in which are formed a plurality of elongate conductive filaments 2 made out of silver. The pores 5 and the filaments 2 have a predominant longitudinal direction indicated by arrow 'A'. A first pair of silver electrodes 3 is electroformed, one on either side of the solid state material 1, such that an imaginary line drawn between the electrodes 3 is substantially perpendicular to the predominant direction 'A'. A second pair of silver electrodes 4 is electroformed, one on either side of the solid state material 1, such that an imaginary line drawn between the electrodes 4 is substantially parallel to the predominant direction 'A'. A DC voltage applied across the electrodes 3 causes an electric field to be generated across the solid state material 1. The electric field induces electrostatic charges in the filaments 2, the charges then being caused to move along the filaments 2 under the influence of the electric field so as to generate a DC voltage across the electrodes 4, this voltage then being available to cause an electric current to pass through a load 7 connected across the electrodes 4.

EXAMPLE 1

Figure 1:
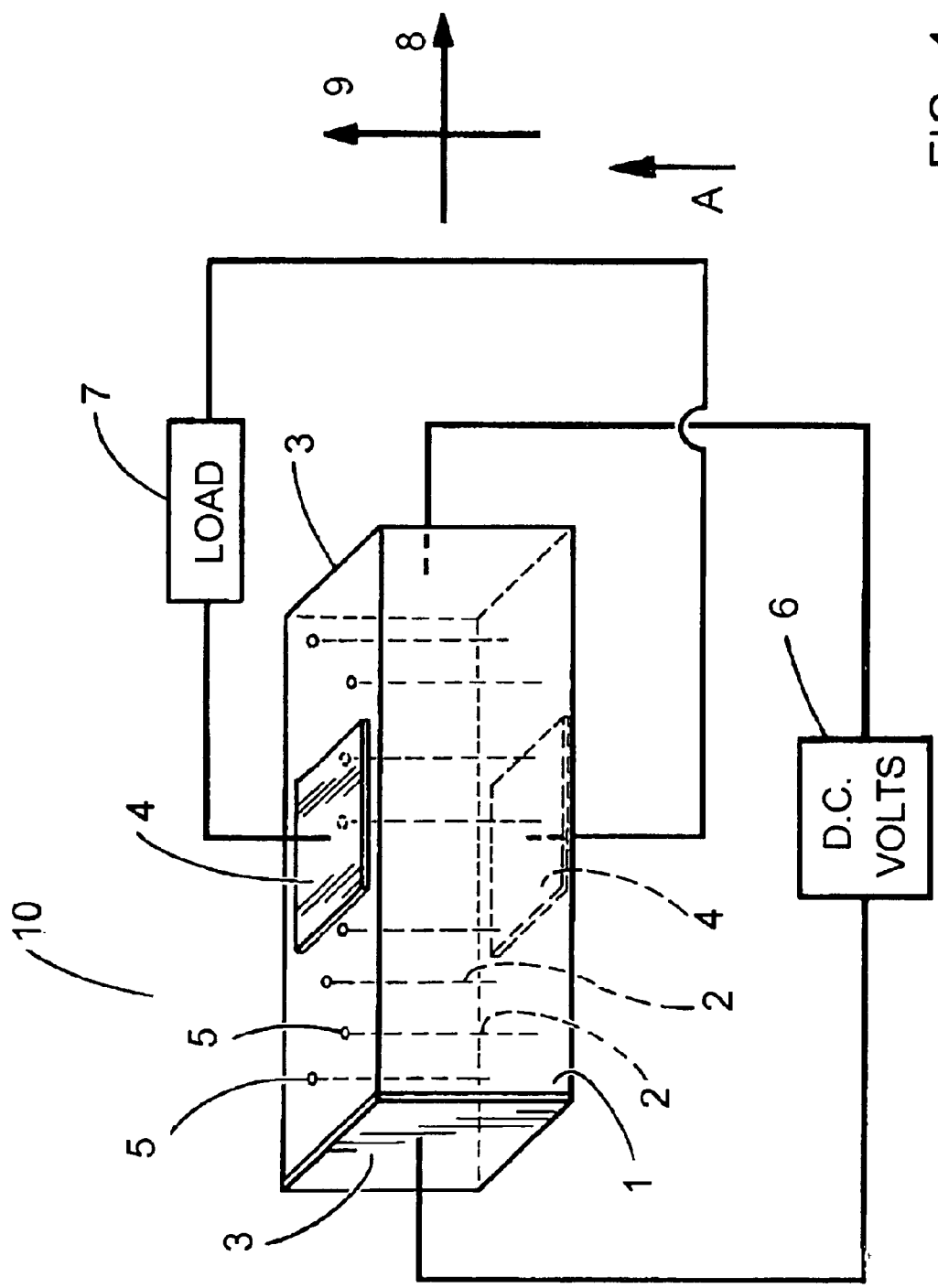
FIG. 1 is a pictorial view which shows a rechargable battery comprising a solid state material provided with two pairs of electrodes.

Piezoceramic Material With Metal Filaments Laid in Pores.

Nanopores are formed on one of the endfaces of a piezoceramic blank produced by standard technology (a pressed piezoceramic charge with a binder is fired at a temperature of 1450° C. and gradually cooled) by an electrical erosion method using a first probe of point diameter 20 nm, made of antimony sulfoiodide (SSbI), by supplying pulses of negative polarity (pitch of treatment—600 nm, modifying voltage 4V; treatment time for each pore—400 nsec). A second probe, made of silver (point diameter 10 nm) is then used, with pulses of positive polarity supplied, to form silver nanofilaments in the formed nanopores by a method of local ion precipitation (pitch of treatment—600 nm; modifying voltage 2V; treatment time for each pore 600 nsec). The positioning of the first and second probes is carried out with the aid of a scanning tunnel microscope. The concentration of pores averaged 3 pores per $\mu m^2$.

A piezoceramic plate treated by the above method was subjected to study for strength (breaking strain). This was 3100 $N/mm^2$, whereas the strength of an analogous plate which had not been subjected to this treatment was 2200 $N/mm^2$.

The electromechanical coupling coefficient, which is inversely proportional to the value of the acoustic losses in the material, increased from 0.71 to 0.85.

What is claimed is:

1. A rechargeable battery including an energy storage member in the form of a solid state dielectric block having two pairs of opposing sides and a pair of opposing ends having formed therein a plurality of generally parallel holes with elongate conductors located within the holes and contacting the energy storage member at least at one point along their lengths, a first pair of electrodes adapted to apply a DC voltage therebetween and one of each of said first pair of electrodes disposed in electrical contact with and on generally opposed ends of the energy storage member in a first spatial orientation and one of each of said second pair of electrodes disposed in electrical contact with and generally on the opposite sides of the energy storage member in a second spatial orientation different from the first.

2. A battery as claimed in claim 1, wherein the block is orthogonal and at least some of the holes and conductors extend in substantially one direction substantially parallel with one pair of electrodes.

3. A battery as claimed in claim 2, wherein more of the holes and conductors extend substantially in a given direction parallel with one pair of electrodes than in any other direction.

4. A battery as claimed in claim 3, wherein the holes and conductors extend substantially perpendicular to the second pair of electrodes.

5. A battery as claimed in claim 1 wherein the first pair of electrodes and the second pair of electrodes are substantially perpendicular to each other.

6. A battery as claimed in claim, 1 wherein the first pair of electrodes is electrodeposited tightly against the first pair of opposite sides of the energy storage member.

7. A battery as claimed in claim 1, wherein the second pair of electredes is eletrodeposited tightly against the opposite ends of the energy storage member.

8. A battery as claimed in claim 1 wherein the conductors are in close contact with the block along the holes.

9. A battery as claimed in claim 1, wherein the energy storage member is formed from a dielectric material.

10. A battery as claimed in claim 1, wherein the energy storage member is formed from a semiconductor material.

11. A battery as claimed in claim 10, wherein the energy storage member is formed from a composite of a semiconductor material and a dielectric material.

12. A battery as claimed in claim 9, wherein the dielectric material is a ceramic material.

13. A battery as claimed in claim 1, wherein at least part of the conductors is formed from silver.

14. A battery as claimed in claim 1, wherein at least part of the conductors is formed from gold.

15. A battery as claimed in claim 1, wherein at least part of the conductors is formed from platinum.

16. A battery as claimed in claim 1, wherein at least part of the conductors is formed from copper.

17. A battery as claimed in claim 1, wherein the holes have a diameter of 10 nm to 200 nm.

18. A battery as claimed in claim 1, wherein the conductors have a diameter of 10 nm to 200 nm.

19. A battery as claimed in claim 1, wherein the holes have a length of 10 nm to 1000 nm.

20. A battery as claimed in claim 1, wherein the conductors have a length of 10 nm to 1000 nm.

* * * * *